(12) United States Patent
Park et al.

(10) Patent No.: US 12,528,229 B2
(45) Date of Patent: Jan. 20, 2026

(54) CUTTING TOOL FOR GANG SAW (71) Applicant: EHWA DIAMOND IND. CO., LTD., Osan-si (KR)

(72) Inventors: Hee-Dong Park, Yongin-si (KR); Nam-Kwang Kim, Cheongju-si (KR); Doo-Hoe Kim, Cheongju-si (KR); Dae-Yeon Rhee, Suwon-si (KR)

(73) Assignee: EHWA DIAMOND IND. CO., LTD., Osan-si (KR)

( * ) Notice: Subject to any disclaimer, the term of this patent is extended or adjusted under 35 U.S.C. 154(b) by 315 days.

(21) Appl. No.: 18/254,372

(22) PCT Filed: Dec. 16, 2021

(86) PCT No.: PCT/KR2021/019170
§ 371 (c)(1),
(2) Date: May 24, 2023

(87) PCT Pub. No.: WO2022/139322
PCT Pub. Date: Jun. 30, 2022

(65) Prior Publication Data
US 2024/0033973 A1   Feb. 1, 2024

(30) Foreign Application Priority Data

Dec. 23, 2020   (KR) .................. 10-2020-0182560

(51) Int. Cl.
*B28D 1/06*   (2006.01)
*B28D 1/12*   (2006.01)

(52) U.S. Cl.
CPC ............... *B28D 1/06* (2013.01); *B28D 1/127* (2013.01)

(58) Field of Classification Search
CPC ................................. B28D 1/06; B28D 1/127
See application file for complete search history.

(56) References Cited

U.S. PATENT DOCUMENTS

| 2,442,153 | A | * | 5/1948 | Van Der Pyl | B28D 1/127 |
| | | | | | 219/616 |
| 2,924,050 | A | * | 2/1960 | Barron | B28D 1/127 |
| | | | | | 428/932 |

(Continued)

FOREIGN PATENT DOCUMENTS

| CN | 1617782 A | 5/2005 |
| CN | 105935805 B | 12/2017 |

(Continued)

OTHER PUBLICATIONS

Extended European Search Report (EESR) corresponding to counterpart European Patent Application EP 21911389.1 dated Apr. 10, 2024.

*Primary Examiner* — Sean M Michalski
(74) *Attorney, Agent, or Firm* — Renner, Otto, Boisselle & Sklar, LLP (57) ABSTRACT

A cutting tool includes a blade formed so as to extend in the width direction or length direction of a workpiece; at least one cutting tip formed so as to protrude from the lower portion of the blade so as to cut the workpiece by reciprocating by means of a swinging motion; and a brazing part formed between the blade and the at least one cutting tip so as to silver-braze the blade and the at least one cutting tip. The brazing part includes a first silver solder layer; a metal sheet layer formed on the first silver solder layer and having a melting point that is higher than a silver brazing process temperature; and a second silver solder layer formed on the metal sheet layer.

6 Claims, 5 Drawing Sheets

(56) References Cited

U.S. PATENT DOCUMENTS

| | | | | |
|---|---|---|---|---|
| 3,009,456 A * | 11/1961 | Fessel | B23D 65/00 | 428/545 |
| 4,205,564 A * | 6/1980 | Kolb | B23D 65/00 | 76/112 |
| 4,407,263 A * | 10/1983 | Murata | B28D 1/127 | 451/541 |
| 4,682,987 A * | 7/1987 | Brady | B24D 99/00 | 51/293 |
| 4,784,033 A * | 11/1988 | Hayden | B23D 65/00 | 83/835 |
| 5,314,512 A * | 5/1994 | Sexton | B28D 1/122 | 51/293 |
| 5,318,006 A * | 6/1994 | Walen | B28D 1/124 | 125/36 |
| 5,368,078 A * | 11/1994 | Rupe | B27F 1/16 | 144/218 |
| 5,791,330 A * | 8/1998 | Tselesin | B23D 61/026 | 51/293 |
| 6,712,062 B2 * | 3/2004 | Wildenburg | B24D 18/0009 | 451/529 |
| 8,327,944 B2 * | 12/2012 | King | E21B 12/00 | 166/117.5 |
| 2003/0148723 A1 * | 8/2003 | Wildenburg | B24D 5/123 | 451/547 |
| 2004/0237723 A1 * | 12/2004 | Kanada | C04B 41/5068 | 407/113 |
| 2009/0229592 A1 * | 9/2009 | Kim | B28D 1/127 | 125/38 |
| 2016/0082619 A1 * | 3/2016 | Park | B23D 61/123 | 125/16.03 |
| 2016/0107334 A1 | 4/2016 | Rhee et al. | | |

FOREIGN PATENT DOCUMENTS

| | | |
|---|---|---|
| CN | 108582503 B | 10/2020 |
| DE | 8713250 U1 | 11/1987 |
| EP | 0309660 A1 | 4/1989 |
| EP | 1481782 A1 | 12/2004 |
| KR | 10-0680851 B1 | 2/2007 |
| KR | 10-1439885 B1 | 9/2014 |
| KR | 10-2014-0144090 A | 12/2014 |
| KR | 10-2152036 B1 | 9/2020 |

* cited by examiner

CUTTING TOOL FOR GANG SAW

This application is a national phase of International Application No. PCT/KR2021/019170 filed Dec. 16, 2021, which claims priority to Republic of Korea (KR) Application No. 10-2020-0182560 filed Dec. 23, 2020, each of which is hereby incorporated herein by reference in its entirety.

TECHNICAL FIELD

The present disclosure relates to a cutting tool provided with a gang saw used to cut a brittle workpiece such as stone, brick, concrete, asphalt, and the like.

BACKGROUND ART

In general, stone materials such as marble and granite are mainly used as interior and exterior materials or flooring materials for buildings, and such stones are roughly quarried in a hexahedral shape in a quarry or the like, and then cut into a plurality of plate-shaped materials and used.

A stone cutting device is used to cut a stone into a plurality of plate shapes, and a frame gang saw is typically used as the stone cutting device. The frame gang saw is widely used for cutting large blocks of stone because there is no limit to the thickness of the work piece because the blade responsible for the actual cutting of the cutting tool may go inside the work piece.

The frame gang saw includes a frame portion, and a plurality of blades are installed on the frame portion. In the related art, a method of cutting a workpiece by spraying an abrasive such as a grain-type steel shot on the frame gang saw has been mainly used, but recently, a frame gang saw in which a cutting tip containing an abrasive material is fixed to a blade has been developed.

On the other hand, the frame gang saw may be largely divided into two types according to the method of moving the blade of the cutting tool. One is to only reciprocate like sawing, and the other is to reciprocate in a swing-type manner. A swing-type reciprocating frame gang saw is commonly used to cut large blocks of granite into plates.

Figure 1A:
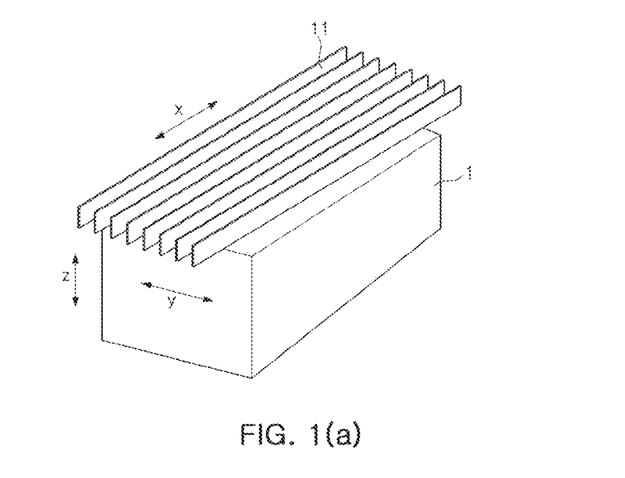
FIG. 1(a) is a schematic view illustrating a state of cutting a workpiece using a gang saw equipped with a plurality of cutting tools.

FIG. 1 schematically illustrates a frame gang saw reciprocating in a swing-type manner. Referring to FIG. 1(a), the frame gang saw includes a plurality of blades 11, and the plurality of blades 11 cut a workpiece 1 while reciprocating in the x-direction. Frame gang saws are usually used with 250 or less steel blades mounted on a frame while being parallel spaced, and are used in a state in which tension is provided thereto. Until now, to cut granite, a steel blade was sprayed with an abrasive, with steel shot and a slurry containing lime. In this case, the tension of about 8 tons is usually used. The cutting technology of spraying an abrasive has a very slow cutting speed, and the descent speed is only a few cm/hr, and thus, it takes almost 3 days to cut a 2 m high granite block.

Figure 1B:
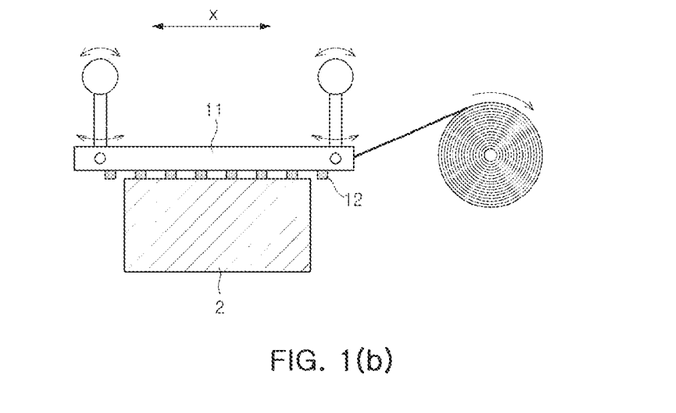
FIG. 1(b) is a view of the gang saw in the y direction, in which some configurations are omitted and simplified.

On the other hand, FIG. 1(b) illustrates a swing-type frame gang saw with cutting tips attached, as in the present disclosure, as viewed from the Y-axis direction of FIG. 1(a). The frame generally reciprocates about two pivots and is lowered into a fixed block of granite. A plurality of cutting tips 12 are provided on the lower side of the blade 11, and the cutting tips 12 are in contact with a workpiece 2 due to the swinging motion of the blade, to perform cutting.

Figure 2:
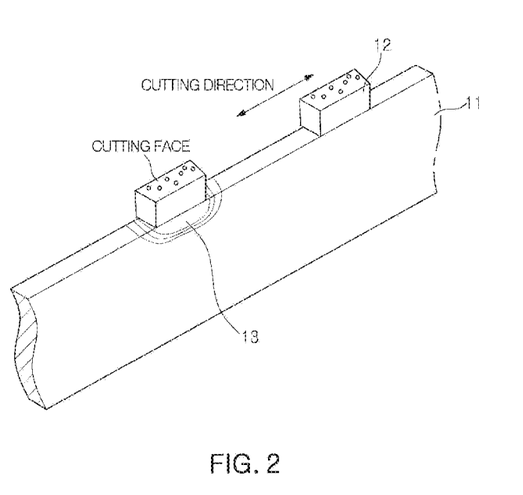
FIG. 2 is a diagram schematically illustrating a portion of a cutting tool for a gang saw.

As illustrated in FIG. 2, the cutting tips 12 may be provided on at least one surface of the blade 11 by a brazing joint at a predetermined interval in the cutting direction. A welding heat affected zone 13 by a brazing process is formed on the side of the cutting tip 12 of the blade 11.

In this case, in the case of a frame gang saw that reciprocates like sawing, the cutting tip 12 of the cutting tool continues to contact the workpiece 2, but in the case of a swing-type, the cutting tip usually collides with the workpiece 2 about 150 times per minute while cutting the workpiece. In this process, the possibility of deformation due to impact increases. Therefore, cracks may occur at the end of the cutting tip on which the blade 11 and the cutting tip 12 are joined or on a position adjacent thereto, and these cracks may propagate in the inside direction of the blade 11 to cause damage to the blade 11.

Figure 3:
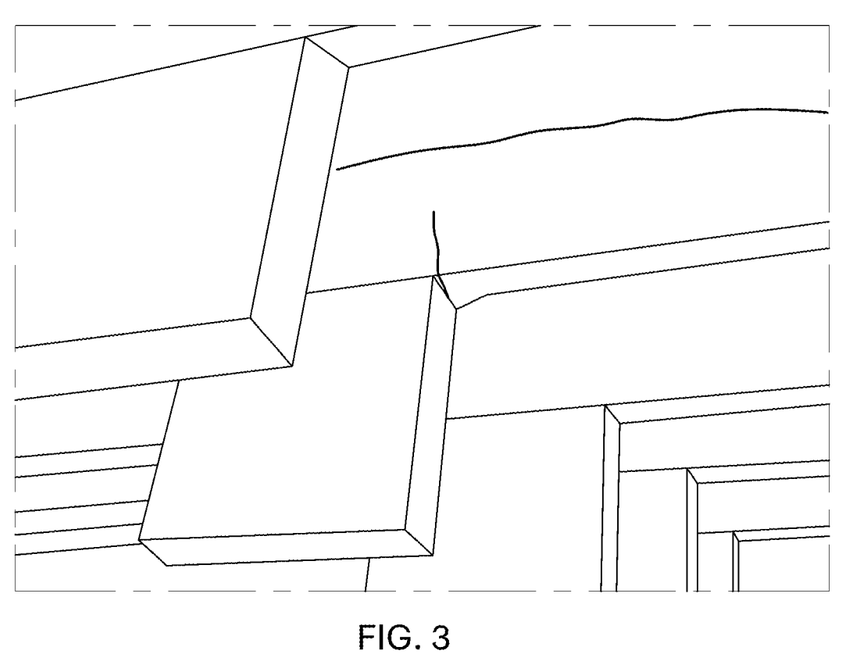
FIG. 3 is an image of cracks occurring at the joint portion of the blade and the cutting tip in a cutting tool for a gang saw of the related art.

FIG. 3 is an image of a crack actually occurring in the end position of the cutting tip 12 that is joined to the blade 11. Referring to FIG. 3, it may be seen that the crack propagates in the inner direction of the blade 11 at an end position of the cutting tip.

In a case in which such cracks occur during the stone cutting process, productivity may be greatly deteriorated due to the interruption of operation and the drop in yield due to the removal of the cracked blade, there is a growing demand for a technology for preventing cracks occurring in the vicinity of the joint portion between the blade and the cutting tip.

PRIOR ART LITERATURE

Patent Literature (Patent Document 1) Korean Patent Application Publication No. 2014-0144090

SUMMARY OF INVENTION

Technical Problem

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a technique for effectively preventing cracks occurring in the vicinity of a joint portion between a blade and a cutting tip in a cutting tool provided in a gang saw used for cutting stone and the like.

Solution to Problem

According to an aspect of the present disclosure, a cutting tool for a gang saw includes a blade configured to extend in a width direction or a length direction of a workpiece; at least one cutting tip protruding from a lower portion of the blade and configured to cut the workpiece while reciprocating in a swinging motion; and a joint portion disposed between the blade and the at least one cutting tip and configured to bond the blade by a brazing and the at least one cutting tip, the joint portion includes a first brazing layer, a metal sheet layer disposed on the first brazing layer and having a melting point higher than a temperature of a brazing process, and a second brazing layer disposed on the metal sheet layer, and based on a direction in which the blade extends laterally, a length of the metal sheet layer constituting the joint portion is equal to, or greater in a lateral direction, than a length of the cutting tip bonded to the joint portion.

The first and second brazing layers may be formed of a Cu—Ag-based material, and have the same compositional component.

The first and second brazing layers may be Cu—Ag-based materials and may have different compositional components.

The metal sheet layer may be formed of any one of Cu, Ni, Co or Fe, or a mixture thereof or a compound thereof.

A total thickness of the joint portion as a multilayer brazing layer may range from 200 to 1200 μm.

In a blade region adjacent to the cutting tip, a heat-affected zone (HAZ) may be disposed, and the joint portion may be configured to have a size capable of covering at least a portion of a surface of the heat-affected zone.

Advantageous Effects of Invention

According to an embodiment, cracks occurring in a cutting tool for a gang saw may be effectively suppressed. Therefore, productivity may be significantly improved in the stone cutting process.

The various and beneficial advantages and effects of the present disclosure are not limited to the above, and will be more easily understood in the process of describing detailed embodiments of the present disclosure.

BEST MODE FOR INVENTION

The terminology used herein is intended only to refer to specific embodiments and is not intended to limit the present disclosure. As used herein, the singular forms also include the plural forms unless the phrases clearly indicate the opposite.

As used herein, the meaning of "comprising" specifies specific characteristics, regions, integers, steps, operations, elements and/or components, and the presence or addition of other specific properties, regions, integers, steps, operations, elements, components and/or groups is not excluded.

Although not defined differently, all terms including technical terms and scientific terms used herein have the same meaning as commonly understood by those of ordinary skill in the art to which the present disclosure belongs. Terms defined in commonly used dictionaries are further interpreted as having a meaning consistent with the related technical literature and the currently disclosed content, and are not to be construed in an ideal or significantly formal sense unless defined.

For convenience of explanation, in this specification, as illustrated in FIG. 1(a), the direction in which the blade reciprocates is defined as the 'x-direction' or 'horizontal direction', and the direction perpendicular to the reciprocating direction is the 'y-direction' or 'vertical direction'. A direction perpendicular to both the 'x direction' and the 'y direction' is defined as the 'z direction' or 'height direction'.

Hereinafter, a cutting tool for a gang saw according to an embodiment of the present disclosure will be described in detail with reference to the accompanying drawings. Embodiments of the present disclosure may be modified in various other forms, and the scope of the present disclosure is not limited only to the embodiments described below. The shapes and sizes of elements in the drawings may be exaggerated for clearer description, and elements indicated by the same reference numerals in the drawings are the same elements.

Figure 4A:
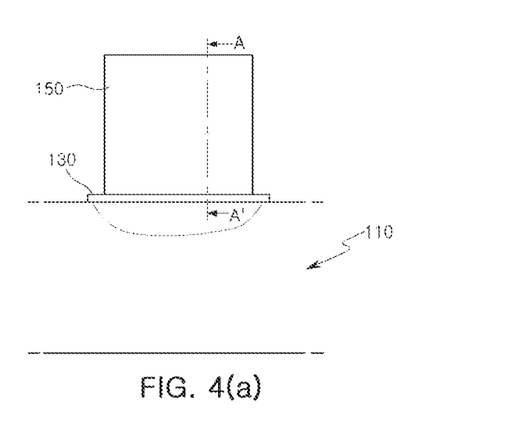
FIG. 4(a) is a diagram schematically illustrating a cutting tool for a gang saw having a joint portion according to an embodiment of the present disclosure.
Figure 4B:
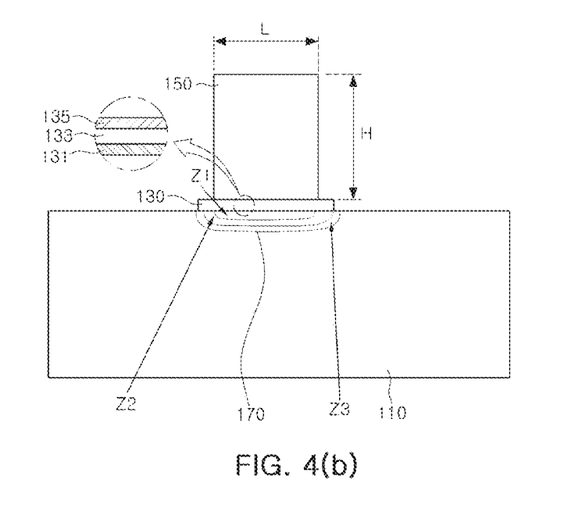
FIG. 4(b) is a detailed view of FIG. 4(a)
Figure 5:
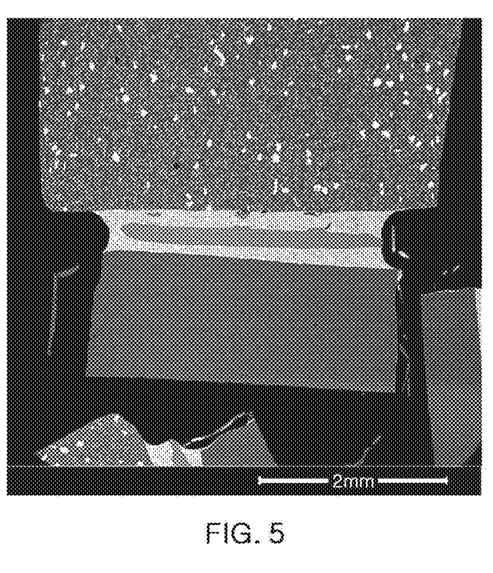
FIG. 5 is an electron micrograph of a cross section taken along line A-A' of FIG. 4(a).

FIG. 4(a) is a diagram schematically illustrating a cutting tool for a gang saw having a joint portion according to a preferred embodiment of the present disclosure, and FIG. 4(b) is a detailed view of FIG. 4(a).

First, as illustrated in FIG. 4(a), a cutting tool for a gang saw according to an embodiment of the present disclosure includes a blade 110 formed to extend in the width direction or the length direction of a workpiece; at least one cutting tip 150 that is formed to protrude from the lower portion of the blade and cuts the workpiece while reciprocating in a swinging motion; and a joint portion 130 formed between the blade and the at least one cutting tip and configured to bond the same by a brazing.

As illustrated in FIG. 4(b), the joint portion 130 includes a first brazing layer 131; a metal sheet layer 133 formed on the first brazing layer 131 and having a melting point higher than a brazing process temperature; and a second brazing layer 135 formed on the metal sheet layer 133. Based on the direction in which the blade 110 extends in a lateral direction, and the length of the metal sheet layer 133 forming the joint portion 130 is equal to the length of the cutting tip 150 joined to the joint portion, or is formed longer in the lateral direction.

In the present disclosure, the blade 110 may extend in the width direction or the length direction of the workpiece, and in more detail, may extend in the direction in which the blade 110 reciprocates when cutting the workpiece. For example, in FIG. 1, the blade 110 reciprocates in the x-direction, and in this case, may extend in the x-direction.

The material of the blade 110 may not be particularly limited, and any blade used in a frame gang saw of the related art may be preferably applied to the present disclosure. For example, the blade 110 may be a high-tensile steel sheet that may sufficiently withstand the tension applied within the frame gang saw. A frame gang saw to which a cutting tip is attached applies a higher amount of tension than a steel shot gang saw, for example, applies 12 to 27 tons of tension, and cutting with a very fast descending speed may be performed. The blades require high-tensile steel to withstand high tension, and each blade is provided in a length of 3 m or more, in a thickness of 1.5 to 5 mm, and in a height of 50 to 250 mm.

On the other hand, in the present disclosure, at least one cutting tip 150 may be formed to protrude from at least one surface of the blade 110, and preferably may be provided on the lower side surface when the blade 110 is installed on the gang saw. When the blade 110 reciprocates during cutting, the protruding cutting tip 150 collides with the workpiece, and actual cutting is performed.

When cutting a workpiece, the blade 110 or the workpiece moves, and the blade swings and reciprocates inside the workpiece. If the width of the portion to be cut by the cutting tip 150 is smaller than the thickness of the blade 110, the blade 110 and the workpiece may come into contact with each other, and problems such as breakage may occur. Therefore, the cutting tip 150 may preferably protrude further than the blade 110 in a direction perpendicular to the direction in which the blade 110 extends, for example, based on the y-direction of the blade 110.

In the present disclosure, the cutting tip 150 may be formed in two or more at a predetermined interval on the lower portion of the blade 110. In this case, it may be preferable that the center-to-center spacing between the cutting tips 150 is 50 to 140 mm.

In addition, in the present disclosure, the cutting tip 150 may include 0.3 to 2.0 cts/cc of diamond. Since the cutting tip 150 includes diamond, cutting by the cutting tip 150 may be performed without supply of a slurry containing an abrasive. The diamond particle size used may be suitably #30 to #80, and diamonds having a size slightly out of this range may also be used depending on the application.

In addition, in the present disclosure, the cutting tip 150 is formed of diamond particles and a metal matrix supporting the diamond particles. In general, since diamond particles are 15 vol % or less in the configuration of the gang saw cutting tip, the physical properties of the cutting tip are determined by the metal matrix. As the metal powder used in the metal matrix, Co, Ni, Fe, or the like may be mainly used. Some other elements, for example, w, bronze, Cu, or the like may be used, but the main metal powder may be Co, Ni or Fe. The blade is formed of steel and exhibits a thermal expansion coefficient (12 to 14 um/(mK)) similar to that of a metal matrix. On the other hand, in the case of the brazing material of the related art including the metal sheet 133, since the cutting tip is formed of cemented carbide, diamond or CBN, in the case in which a thermal expansion coefficient between the blade 110 and the cutting tip 150 is relatively great, the cutting tip 150 is used for brazing welding of the blade 110 in order to prevent the occurrence of cracks in the cutting tip due to such a large difference in thermal expansion coefficient.

Therefore, in an embodiment of the present disclosure, as described above, the thermal expansion coefficients of the blade 110 and the cutting tip 150 are almost similar. Accordingly, cracks caused by differences in thermal expansion of the blade and the cutting tip, which is problematic in the related art as the difference in the coefficient of thermal expansion between the blade 110 and the cutting tip 150 is relatively small, is not problematic in an embodiment of the present disclosure. However, in the present disclosure, a multilayer brazing joint layer is formed between the blade 110 and the cutting tip 150 for the usage described later.

For example, the cutting tool of the present disclosure includes the joint portion 130 formed between the blade 110 and the at least one cutting tip 150 and configured to bond the same by brazing. In the present disclosure, also, the joint portion 130 includes the first brazing layer 131; the metal sheet layer 133 formed on the first brazing layer 131 and having a melting point higher than a brazing bonding process temperature; and the second brazing layer 135 formed on the metal sheet layer 133.

As described above, a detailed reason for using the multilayered brazing joint layer as the joint portion 130 for bonding the blade 110 and the cutting tip 150 of the cutting tool in the present disclosure is as follows.

The gang saw of the present disclosure includes the blade 110, the cutting tip 150 and the joint portion 130. The cutting tip 150 is impacted by the reciprocating motion of the gang saw. The impact is transferred to the joint portion 130 and the blade 110 through the cutting tip 150. The impact by the reciprocating motion of the gang saw is applied in a direction (the x-direction) parallel to the blade 110, in a direction perpendicular to the blade 110 (in the y, z direction), or a combination thereof (x-y directions). The impact causes compressive stress and tensile stress, and causes a fatigue phenomenon in which compressive stress and tensile stress are repeatedly generated by reciprocating motion. In addition, since most of the impact is applied at a constant angle with respect to the cutting tip 150 due to the swing motion, the impact causes a rotational momentum to rotate the cutting tip 150. These compressive, tensile and fatigue stresses, and rotational momentum are all referred to as external stresses.

The cutting tip 150 employed in the actual field is applied with a height (H) gradually increased so that it may be used for a longer period of time, and sometimes, a form in which the height (H) is greater than the length (L) is applied. For example, the length may be 20 to 25 mm, while the height may be 30 mm or more. This trend is to increase the life of the gang saw to increase the efficiency of work and to reduce costs accordingly, and it is a growing trend. As the height (H) compared to the length (L) increases, the rotational momentum increases. Therefore, in recent years, external stress due to rotational momentum has become more important. For example, methods to suppress the occurrence and propagation of cracks by mitigating the impact caused by these various external stresses are being sought.

Therefore, paying attention to this problem, the cutting tool of the present disclosure includes the joint portion 130 provided as the multilayer brazing layer, formed between the blade 110 and the at least one cutting tip 150 and configured to bond the same by brazing. In detail, the cutting tool of the present disclosure provides the joint portion 130 as the multilayer brazing layer, including the first brazing layer 131; the metal sheet layer 133 formed on the first brazing layer 131 and having a melting point higher than a brazing bonding process temperature; and the second brazing layer 135 formed on the metal sheet layer 133.

For example, the multilayer brazing joint layer is formed by stacking the first brazing layer 131, the metal sheet layer 133 as an insoluble layer, and the second brazing layer 135 in a sandwich shape. In this case, the material components of the first and second brazing layers 131 and 135 may be identical to each other, or a portion of the components may be changed in consideration of the adhesive force with the respective cutting tip and blade.

In the present disclosure, the material of the first and second brazing layers 131 and 135 is a general brazing material based on Cu—Ag, and the thickness thereof may preferably be 50 to 400 μm after brazing.

The metal sheet layer 133, which is the insoluble layer, may be formed of a material that does not melt at the temperature of the brazing process, for example, formed of any one of Cu, Ni, Co, or Fe, or a mixture thereof, or a compound thereof. These metals may be interposed while maintaining the original shape thereof inside the joint portion because the metal sheet is not melted even through the brazing process.

In the present disclosure, as an example of a brazing welding material for manufacturing the multilayer brazing joint layer 131, Umicore's Brazetec 49/Cu may be used instead of Umicore's Brazetec 4900 of the related art. In general, Brazetec 49/Cu is used when the cutting tip is formed of cemented carbide or PCD, but is not usually used when most components of the cutting tip are formed of components such as Co, Fe, Ni and Cu. However, in the present disclosure, although most components of the cutting tip are composed of components such as Co, Fe, Ni, Cu and the like, a brazing welding material such as Brazetec 49/Cu may be used.

It may be preferable to manage the total thickness of the multilayer brazing solder joint layer 130 in the range of 200 to 1200 µm.

In general, it is a common fact that multilayer brazing has about 30% less bonding strength than single-layer brazing. In spite of such poor adhesion, the general reason for using multilayer brazing is to reduce damage caused by thermal shock when the difference in the coefficient of thermal expansion between the blade and the cutting tip is large. For example, multilayer brazing is used to join PCD and CBN cutting tips having great differences in thermal expansion coefficients to iron-based blades. PCD and CBN cutting tips have a great difference in thermal expansion coefficient from that of iron blades. If the difference in the coefficient of thermal expansion is large, cracks are generated in the cutting tip due to thermal shock in the cooling process after the brazing process.

Recently, since the cutting speed by the gang saw, load, and height (H) of the cutting tip have been gradually increased, the impact caused by the external stress is becoming more serious. When an impact due to an external stress is applied to the gang saw, a crack may occur in the blade 110. In addition, a heat-affected zone (HAZ) is formed on the blade around the cutting tip by the heat received by the brazing welding described above. In this case, since the heat history is different, the structure and physical properties are different depending on the location of the heat-affected zone. For example, in high-tensile steel, a soft zone having a lower hardness than the surroundings, in a specific location of the heat-affected zone, may be formed. Accordingly, the crack occurs in a region, proceeding in a direction (y-direction) traversing to the blade in the soft zone. Cracks generated in the soft zone are easily propagated in the vertical direction of the blade because the blade 110 is continuously applied in a tensile stress state. In the case in which the crack occurs, the cutting operation by the gang saw should be stopped, the corresponding part should be replaced, and the blade 110 itself should be discarded, resulting in a large economic loss. Accordingly, it is necessary to suppress as much as possible so that cracks do not occur in the blade due to the impact caused by external stress.

Therefore, the multilayer brazing joint layer 130 of the present disclosure may alleviate the impact when there is an impact due to an external stress like a swing-type frame gang saw. When the external impact is alleviated by the multilayer brazing joint layer 130, the possibility of cracks occurring in the blade 110 is reduced. In detail, when the material, thickness, and the like of the multilayer brazing joint layer capable of mitigating the impact within the deviation of the threshold value is adjusted after checking the critical value at which cracks occur by analyzing the behavior of the external stress in consideration of HAZ to be described later, the occurrence of cracks may be sufficiently suppressed.

On the other hand, in the process of bonding the cutting tip 150 to the blade 110 by brazing, a heat-affected zone (HAZ) 170 is formed on the blade 110. Since the blade 110 of the present disclosure has an approximately flat surface, the shape of the heat-affected zone HAZ may have a round shape as illustrated in FIG. 4(*b*). However, in general, the shape of the HAZ may vary depending on the surface shape of the blade. For example, the shape of the HAZ may vary in a case in which the surface shape of the blade has a curvature or there is a groove in the blade below the outer side of the cutting tip.

However, the HAZ is generated due to the thermal behavior of the brazing, and a maximum heating temperature thereof is different depending on the location on which the heat is received, and thus, is divided into parts having different microstructures and mechanical properties. In FIG. 4(*b*), cases of Z1, Z2, and Z3 parts are expressed. The Z1, Z2, and Z3 are generated by the thermal behavior, and the respective Z1, Z2, and Z3 have different microstructures and have a difference in mechanical properties such as hardness. The HAZ may have different sizes and shapes of Z1, Z2, and Z3 depending on the material of the blade 110 and the brazing temperature.

On the other hand, each of Z1, Z2, and Z3 represents the zone having almost similar mechanical properties, and are separated by a boundary therebetween. Respective heat-affected zone regions are continuous from one surface of the blade to the other surface of the blade, traversing the blade 110 under the cutting tip 150, with the cutting tip 150 interposed therebetween. For example, the boundary starts at one side of the surface of the blade 110 and ends at the other side. At the beginning and ending portions of the boundary, a soft zone vulnerable to external stress exists in any one of Z1 to Z3. Accordingly, the soft zone starting from the blade surface is connected in the z-direction close to a right angle from the blade surface, and has a structure in which it passes the lower portion of the cutting tip in a round shape and is connected close to a right angle to the other surface. For example, the shape of the soft zone is perpendicular with respect to the tensile stress on the blade surface, and thus, is a structure that is very vulnerable to cracks under the condition that the blade is subjected to external tensile stress in the x direction. Therefore, even when the above-described multilayer brazing joint layer 130 is applied, in the case in which stress concentration due to external stress occurs, cracks may occur easily beyond the threshold for cracking.

Therefore, to prevent this problem, in an embodiment of the present disclosure, based on the direction in which the blade 110 extends in a lateral direction, the length of the metal sheet layer 133 constituting the joint portion 130 may be equal to or greater than the length of the cutting tip 150 joined to the joint portion 130.

For example, based on the direction in which the blade 110 extends laterally, the length of the metal sheet layer 133 forming the joint portion 130 may be formed to be the same as or greater in the lateral direction than the length of the cutting tip 150 joined to the joint portion 130, thereby suppressing the concentration of stress at the point where the cutting tip 150 and the blade 110 meet. In detail, when the length of the metal sheet layer 133 constituting the joint portion 130, which is the multilayer brazing joint layer, is longer than the length of the cutting tip 150 bonded to the joint portion 130, the wing of the joint portion 130 extends outside of the cutting tip 150, and covers the soft zone of the HAZ on which the stress is concentrated. Therefore, cracks may be effectively prevented from occurring in the soft zone of the HAZ. In addition, since the stress is not concentrated in the soft zone and there is an effect of dispersing the stress in the wing of the joint portion 150, the stress concentration is prevented from occurring, and the occurrence of the crack may be sufficiently suppressed by disrupting the stress concentration. In addition, there is an effect of effectively preventing the concentration of stress due to the occurrence of cusp at the point where the ends of the blade 110 and the cutting tip 150 meet.

In general, in a state in which high tension is always applied to the blade 110 provided in the gang saw when cutting, work is done. The high tensile stress and low hardness are formed in the heat-affected zone (HAZ), and the stress is concentrated on the end of the cutting tip 150 of the joint portion 130 due to the impact that the cutting tip 150 receives during cutting, resulting in occurrence of cracks. In the present disclosure, the occurrence of cracks due to stress concentration may be effectively suppressed by covering and protecting the end portion of the cutting tip 150 in which cracks are likely to occur and a position close thereto with the joint portion 130 having the metal sheet layer 133. For example, in the present disclosure, the metal sheet layer 133 is formed to a size that may cover at least a portion of the surface of the heat-affected zone (HAZ) formed in the blade region adjacent to the cutting tip 150, and thus, the occurrence of cracks due to stress concentration may be effectively suppressed.

Hereinafter, the present disclosure will be described in more detail through examples. However, it is necessary to note that the following examples are only for exemplifying and embodying the present disclosure, and not for limiting the scope of the present disclosure. This is because the scope of the present disclosure is determined by the matters described in the claims and matters reasonably inferred therefrom.

EXAMPLE

In the cutting operation using a gang saw, various experiments were conducted to understand the pattern of cracks occurring in the blade during the cutting operation according to the type of brazing material.

In detail, 80 or 150 blades were configured as a set in various types of swing-type gang saws for granite, and the cutting operation was performed. The swing-type gang saw used is a machine manufactured by Gaspari. 30 to 40 cutting tips were attached to each blade by brazing welding at appropriate intervals. Each cutting tip was manufactured to have a length of 23 mm, a width of 5 mm, and a height of 30 mm, and with respect to the spacing between the cutting tips, the cutting tips were attached at a different spacing of 50 mm to 130 mm for each location to solve the problem that the wear rate varies depending on the position of the workpiece.

On the other hand, two types of brazing welding materials were used in the form of sheets. As illustrated in Table 1 below, as the related art material, Umicore's Brazetec 4900 which is most commonly used was used, and as the invention material, Umicore's Brazetec 49/Cu was used. Then, the brazing material in the form of a sheet was cut to a length of about 27 mm and is sandwiched between respective cutting tip and blade, thereby being bonded by brazing. The width of the brazing material was 2.5 mm, 3 mm, 3.5 mm, and 4 mm, and the thickness of the blade was formed to have a width close to 3.5 mm.

Brazetec 49/Cu is a type in which a metal sheet is provided in the middle layer and is in a state in which the brazing welding material wraps the Cu sheet on both sides. Brazing was heated to 850° C. for about 3 to 10 seconds using a high-frequency heating method, and then cooled by air. In this case, the Cu sheet was not melted and maintained in a solid state.

Various types of granite corresponding to class 3 were used, and have the average height of 1.9 m and the width of 2 m. In each test, the blade descended slowly at a descending speed of 40 mm/hr until it stably entered the granite block, up to the initial 200 m. When the blade was completely inside the granite block, it worked with a descending speed of 80~270 mm/hr. When the workpiece is almost cut and only 50 mm is left, the descending speed was reduced to 50 mm/hr to finish the work stably. It took 12-30 h to cut one granite block. As long as the blade does not break during operation, after the operation was completed, each blade was checked and cracks were observed.

Table 1 below illustrates the evaluation of the crack occurrence rate according to the type of the cutting tip and the brazing welding material. In the evaluation of the crack occurrence rate, when cracks occurred in each blade even at one cutting tip position, it was regarded as a cracked blade, and after use until the cutting tip is completely worn, it is expressed as the fraction of the blade having crack compared to the total blades. For example, in the case of the invention material of Table 1 below, when cracks occurred in 4 blades out of a total of 80 blades, a crack occurrence rate of 5% is illustrated. The initial crack occurrence was measured when cracks occurred even with one blade. In the case of the related art material, after cutting one granite block on average, cracks occurred in at least one blade, but in the case of the present inventive material, it could be seen that cracks were found in one or more of the blades after 7-8 granite blocks were cut. In general, the cutting tip is completely worn out when about 10 granite blocks are cut, and thus, it is used after reattaching a new cutting tip to the blade.

TABLE 1

| | Brazing material | Cutting tip component (wt. %) | Crack occurrence rate | First crack occurrence |
|---|---|---|---|---|
| Related art material | Brazetec 4900 | 100Co<br>40Fe—40Co—10Ni—5Sn—5Cu | 50~80%<br>50~80% | 20 hr<br>20 hr |
| Invention material 1 | Brazetec 49/Cu | 100Co<br>40Fe—40Co—10Ni—5Sn—5Cu | 3~9%<br>3~9% | 200 hr<br>200 hr |

As illustrated in Table 1, the related art material and the invention material used a cutting tip having a component of 100Co wt % and a cutting tip having a component of 40Fe-40Co-10Ni-5Sn-5Cu, respectively, and no substantial difference was found in the degree of occurrence of cracks depending on the component of the used cutting tip. However, it can be seen that the crack generation pattern varies greatly depending on the type of brazing welding material used.

On the other hand, Table 2 below illustrates the experimental results of measuring the crack occurrence rate according to the width of the brazing welding material in more detail. As illustrated in Table 2 below, it can be seen that the crack occurrence rate is greatly reduced when the brazing welding material in the form of a metal sheet is used regardless of the width of the brazing welding material.

TABLE 2

| | Brazing material | Brazing material width | Crack occurrence rate | First crack occurrence |
|---|---|---|---|---|
| Invention material 1 | Brazetec 49/Cu | 2.5 mm | 8.9% | 140 hr |
| Invention material 2 | Brazetec 49/Cu | 3.0 mm | 5.0% | 200 hr |
| Invention material 3 | Brazetec 49/Cu | 3.5 mm | 2.8% | 250 hr |
| Invention material 4 | Brazetec 49/Cu | 4.0 mm | 2.8% | 250 hR |

Although described with reference to the above embodiment, those skilled in the art will understand that various modifications and changes can be made to the present disclosure without departing from the spirit and scope of the present disclosure as set forth in the claims below.

DESCRIPTION OF REFERENCE CHARACTERS 110 blade
130 joint portion
131 first brazing Layer
133 metal sheet layer
135 second brazing layer
150 cutting tip
170 heat-affected zone (HAZ)

The invention claimed is:

1. A cutting tool for a gang saw, comprising:
a blade configured to extend in a width direction or a length direction of a workpiece;
at least one cutting tip protruding from a lower portion of the blade and configured to cut the workpiece while reciprocating in a swinging motion; and
a joint portion disposed between the blade and the at least one cutting tip and configured to bond the blade and the at least one cutting tip by a brazing,
wherein the joint portion includes a first brazing layer, a metal sheet layer disposed on the first brazing layer and having a melting point higher than a temperature of a brazing bonding process, and a second brazing layer disposed on the metal sheet layer,
based on a direction in which the blade extends laterally, a length of the metal sheet layer constituting the joint portion is equal to, or greater in a lateral direction, than a length of the cutting tip bonded to the joint portion, and
wherein in a blade region adjacent to the cutting tip, a heat-affected zone (HAZ) is disposed, and the joint portion is configured to have a size capable of covering at least a portion of a surface of the heat-affected zone.

2. The cutting tool for a gang saw of claim 1, wherein the first and second brazing layers are formed of a Cu—Ag-based material, and have the same compositional component.

3. The cutting tool for a gang saw of claim 1, wherein the first and second brazing layers are Cu—Ag-based materials and have different compositional components.

4. The cutting tool for a gang saw of claim 1, wherein the metal sheet layer is formed of any one of Cu, Ni, Co or Fe, or a mixture thereof or a compound thereof.

5. The cutting tool for a gang saw of claim 1, wherein a thickness of the joint portion as a multilayer brazing joint layer ranges from 200 to 1200 μm.

6. The cutting tool for a gang saw of claim 1, wherein the first and second brazing layers each have a thickness in a range of 50 to 400 μm.

* * * * *